BEST AVAILABLE COPY

N. S. GILBERT.

Fruit Jar.

No. 3,111. Reissued Sept. 1, 1868.

Witnesses
Charles Spencer
C. H. Alexander

Inventor
N. S. Gilbert
per T. H. Alexander Atty

H. PETERS, Photo-Lithographer, Washington, D. C.

BEST AVAILABLE COPY

JNITED STATES PATENT OFFICE.

S. B. ROWLEY, OF PHILADELPHIA, PA., ASSIGNEE OF N. S. GILBERT.

IMPROVED FRUIT-JAR.

ecification forming part of Letters Patent No. 2,934, dated December 17, 1861; reissue No. 3,111, dated September 1, 1868.

*all whom it may concern:*

3e it known that I, S. B. ROWLEY, of iladelphia, Pennsylvania, am the owner of tain Letters Patent, granted on the 17th of December, 1861, to N. S. GILBERT, of kport, New York, for an Improved Pre-ve-Jar; and I do hereby declare the follow-ing to be a full, clear, and exact descrip-n of the same.

Figure 2:
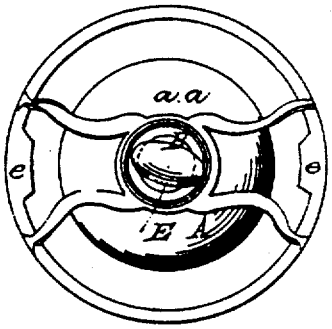

'he invention of the said N. S. GILBERT con-s, first, of a jar having an exterior shoul-arranged below the mouth for the recep-n of a cover and packing-ring, substantially lescribed hereafter; secondly, in the com-ation of a bale or its equivalent with a er adapted to the mouth of a jar, and to exterior shoulder below the said mouth, all stantially as hereafter explained.

n order to enable others skilled in the art carry out this invention, I will now pro-l to describe a mode of constructing the e, reference being had to the accompany-drawing, which forms a part of this speci-tion, and in which— igure 1 is a vertical section of a jar with improvement; Fig. 2, a plan view.

Figure 1:
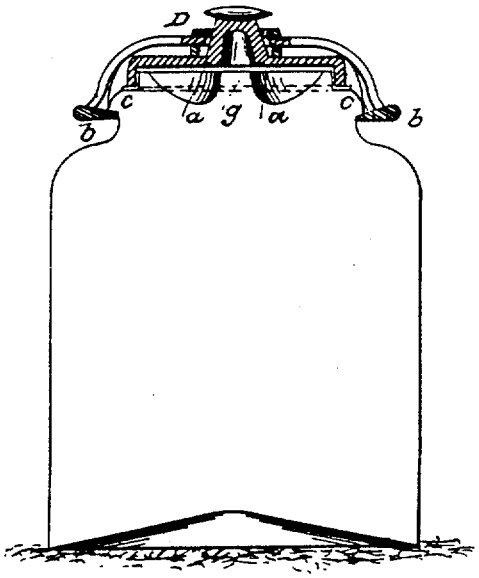

Fig. 1 is represented a jar having below nouth an exterior shoulder for receiving sket or packing of gum-elastic or other material. In the present instance, this rior shoulder is situated above a flange nlargement, *c*, on the neck of the jar, and enlargement is flattened at *e e* to admit projections *b b* of the bail D.

ie cover A *a* has a flange fitting loosely the mouth of the jar, and bearing on the ing-ring, which rests on the above-men-d exterior shoulder. In the center of over is a projection, *g*, terminating in an tical button, which, when the cover is held uely, will pass through a central open-n the bail, the button, however, serving nfine the bail to the cover when the two py their proper relative positions. The al projection of the cover is such, how-that the bail is permitted a limited ver-play independently of the said cover.

e bail and cover being thus connected her, the latter is so adjusted to the jar its flange will overlap the neck of the same, and bear on the packing-ring, and the bail is so adjusted that its projections shall pass down the flattened portions of the flange or enlargement *c* of the jar. The bail is now turned so that its projection *b* shall pass beneath, and in contact with, the inclined planes formed beneath the said flange or enlargement *c*, and thus the bail will be depressed, and will exert a pressure on the cover, between which and the exterior shoulder the packing-ring will be so compressed as to form a perfectly tight joint.

It will be seen that what has been termed the bail D consists, in the present instance, of a ring, on the inner edge of which are the two projections *e e*, the ring being connected by arms to a central hub, through which passes the projection of the cover A, as described above.

On turning the bail, it has a screw-like action on the jar, and either depresses the cover or relieves the same from pressure, according to the direction in which it (the bail) may be turned, this turning of the bail imparting no motion to the cover, excepting a vertical one; hence no torsion is imparted to the packing-ring.

It will be evident, however, that this so-called bail may be modified both in form and construction, the only requisite being that it shall bear on the cover, and shall be arranged for a screw-like action on the jar, at a point below the shoulder on which the packing-ring rests, the sole object of the bail or its equivalent being the depression of the cover without turning the same.

The most important feature of this invention is the exterior shoulder, arranged below the mouth of the jar for the reception of the packing-ring and cover.

Two important ends are attained by this arrangement: first, it affords facilities for easily introducing the ring to and retaining it in its place; second, the ring is maintained free from contact with the contents of the vessel, to which it would otherwise impart an unpleasant taste.

I claim as the invention of the aforesaid N. S. GILBERT—

1. A jar having a shoulder on the neck

BEST AVAILABLE COPY below the mouth, a flanged cap which overlaps the neck, and a packing which is compressed between the shoulder and the cap, substantially as set forth.

2. The combination of a cover, A, adapted to the mouth of a jar and to a packing on an exterior shoulder below the mouth, with a bail, D, or its equivalent, arranged to have a screw-like action on the jar below the s shoulder, all substantially as described.

In testimony whereof I have signed name to this specification before two subscr ing witnesses.

S. B. ROWLEY

Witnesses:
H. HOWSON,
C. B. PRICE.